C. H. LIKELY.
AUTOMATIC VEHICLE BRAKE.
APPLICATION FILED JUNE 15, 1914.
1,137,500.
Patented Apr. 27, 1915.
2 SHEETS—SHEET 1.
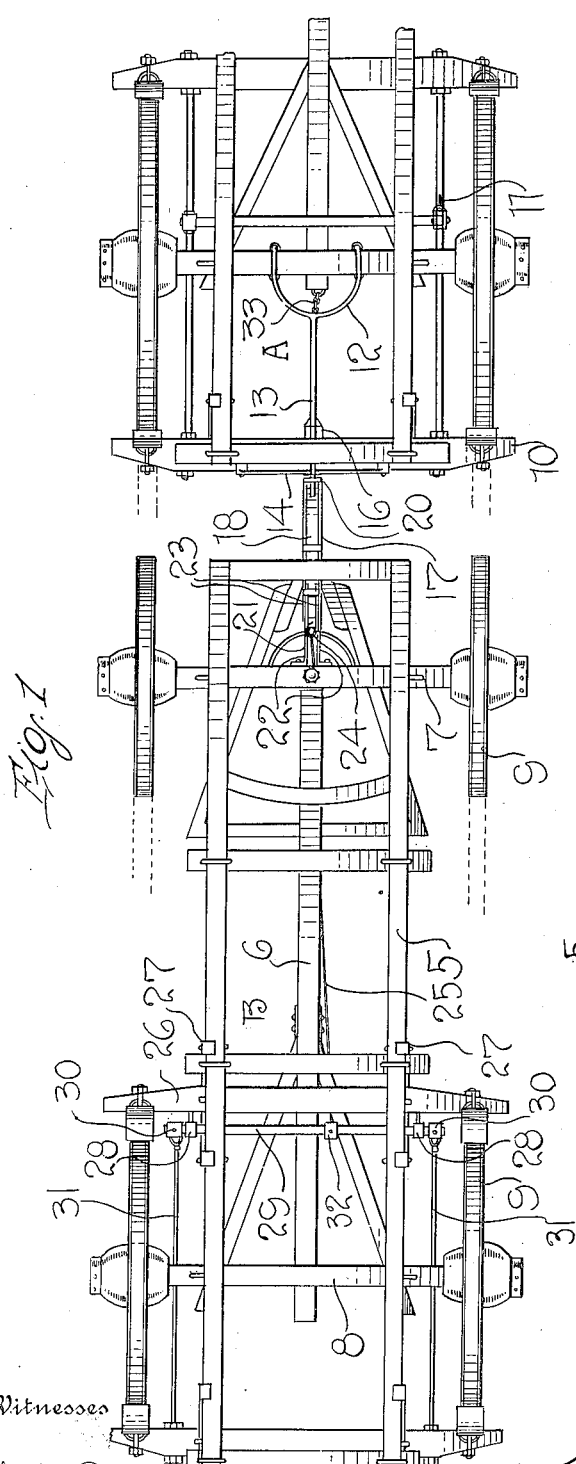
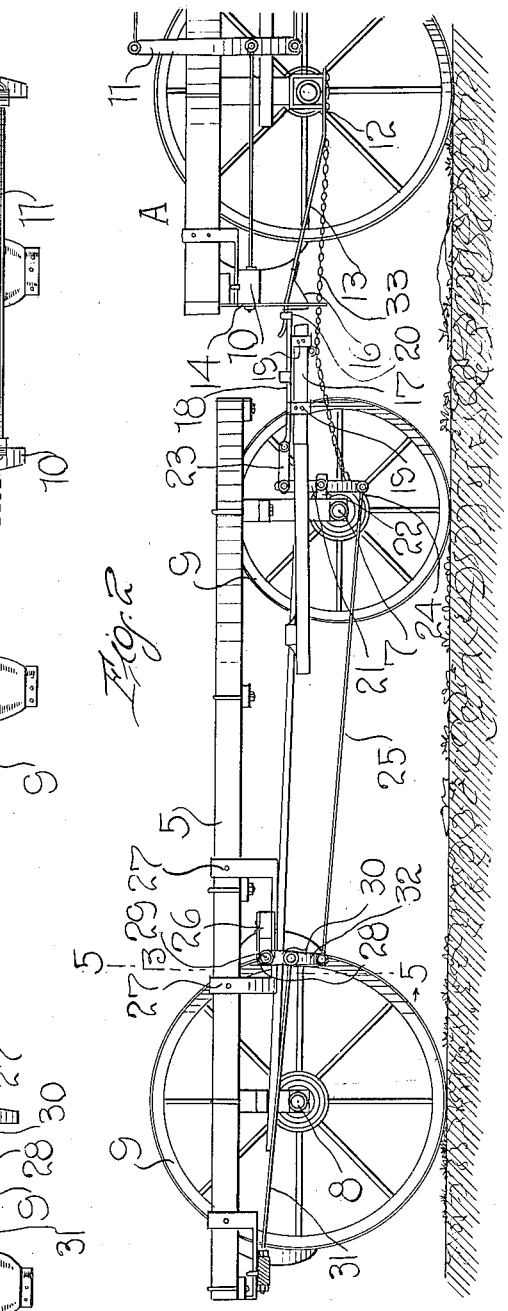
Inventor
CHARLES H. LIKELY
By Watson E. Coleman
Attorney
Witnesses
Robert M. Sulpher
A. L. Hind C. H. LIKELY.
AUTOMATIC VEHICLE BRAKE.
APPLICATION FILED JUNE 15, 1914.
1,137,500.
Patented Apr. 27, 1915.
2 SHEETS—SHEET 2.
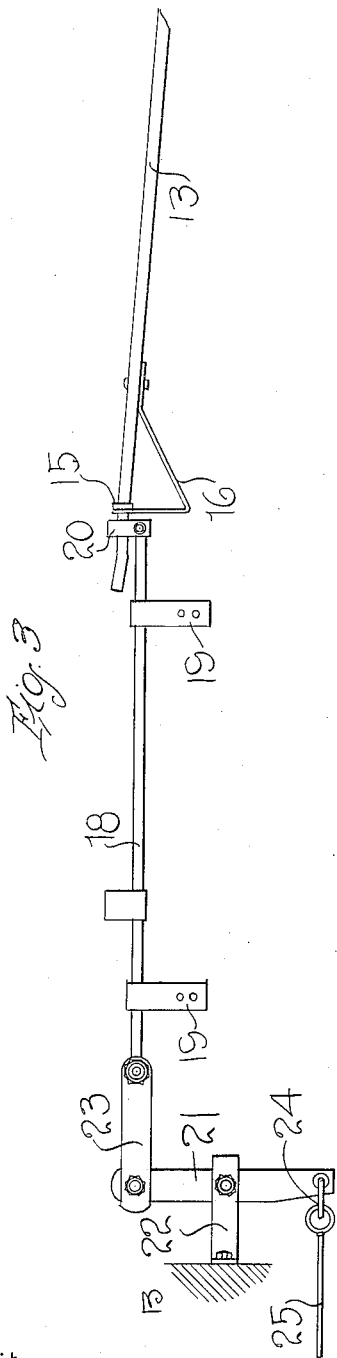
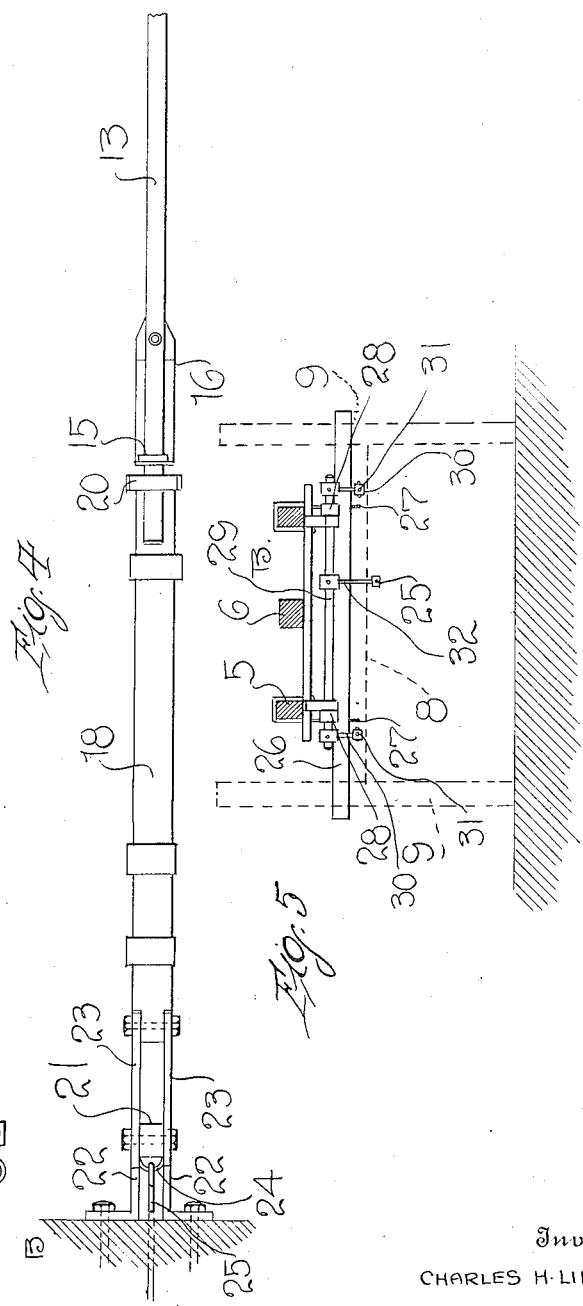
Inventor
CHARLES H. LIKELY
Witnesses
Robert M. Lutphen
A. I. Hind
By Watson E. Coleman
Attorney

UNITED STATES PATENT OFFICE.

CHARLES H. LIKELY, OF WOODY, CALIFORNIA.

AUTOMATIC VEHICLE-BRAKE.

1,137,500.   Specification of Letters Patent.   Patented Apr. 27, 1915.

Application filed June 15, 1914.   Serial No. 845,168.

*To all whom it may concern:*

Be it known that I, CHARLES H. LIKELY, a citizen of the United States, residing at Woody, in the county of Kern and State of California, have invented certain new and useful Improvements in Automatic Vehicle-Brakes, of which the following is a specification, reference being had to the accompanying drawings.

This invention relates to vehicle brakes and more particularly to brakes of that character employed upon trail wagons which are coupled to the rear end of a lead wagon.

Succinctly stated, the primary object of the invention is to provide means for automatically applying the brakes to the wheels of the trail wagon upon a forward or advance movement of the same with respect to the lead wagon when descending a grade.

In its more specific aspect, my invention comprehends the provision of an improved coupling between the lead and trail wagons embodying a rearwardly extending rod or bar secured to the rear axle of the lead wagon and provided with a suitable bumper. a slidable plate mounted upon the tongue of the trail wagon and loosely engaged upon the rear end of said rod, and operating connections between said plate and the brake beam of the trail wagon, whereby the brakes are automatically applied upon the sliding movement of the plate occasioned by the same striking the bumper on the lead wagon.

My invention has for still another object to produce an automatic brake of the above character which is extremely simple in its construction, highly efficient and reliable in practical use and may be readily applied to various makes of vehicles now in general use without necessitating any material alterations in their construction.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a top plan view of the bed frame and running gear of a trail wagon and a portion of the lead wagon, showing my invention as applied thereto. Fig. 2 is a side elevation with the wheels on one side removed. Fig. 3 is an enlarged side elevation of the coupling and brake operating means for the trail wagon. Fig. 4 is a plan view thereof. Fig. 5 is a section taken on the line 5—5 of Fig. 2.

Referring in detail to the drawings, 5 designates the bed frame of a farm wagon or other vehicle upon which the body (not shown) is mounted in any usual or preferred manner. This bed frame is arranged upon the running gear 6 which includes front and rear axles 7 and 8 respectively. Ground wheels 9 are revolubly mounted upon the ends of these axles. This general description applies both to the forward or lead wagon A and to the rear or trail wagon B.

10 designates the transverse brake beams mounted upon the frame of the lead wagon, said beams being provided at their ends with the usual brake blocks for application to the peripheries of the rear ground wheels at diametrically opposite points. These brake beams are shifted upon the application of the brakes by means of suitable manually operable connections, indicated at 11. As the means for operating the brakes upon the forward or lead wagon constitutes no part of the invention, the same will not, therefore, be set forth in detail.

To the underside of the rear axle of the lead wagon A, the forked arms 12 formed upon one end of a rod or bar 13 are secured by means of clips or in any other desired manner. The rear end of this rod or bar is mounted in a depending bracket 14 secured to the rear transverse bar or the side rails of the bed frame 5. Upon this rod a collar 15 is secured and is adapted to limit the movable end of a spring bumper plate 16 which is engaged upon said rod, the other end of said plate being riveted or otherwise secured to the underside of the rod 13.

17 designates a short forwardly extending tongue which is secured between the forward hounds of the running gear 6 of the trail wagon. A bar 18 is mounted upon the upper side of this tongue for sliding movement and is retained in position thereon by means of loops 19, the ends of which are secured to the opposite sides of the tongue. Upon the forward end of this bar a sleeve 20 is secured, in which the rear end of the rod 13 is loosely engaged. A lever 21 is fulcrumed intermediate of its ends in a bracket 22 which is secured upon and extends forwardly of the front axle 7 of the trail wagon B. To the upper end of this lever the rear ends of a pair of links 23 are pivotally connected, said links being connected at their other ends to the rear end of the sliding bar 18. A loop 24 is loosely connected to the lower end of this lever and to the same the forward end of a rod 25 is connected.

26 designate the transverse brake beams of the trail wagon B, said beams being slidably mounted in depending guide irons 27 which are secured to the longitudinal rails of the bed frame 5. The ends of these brake beams are provided with the usual brake blocks for application to the ground wheels. To the rear edge of the forward brake beam 26 bearing sleeves 28 are secured, and in the same the ends of a rod 29 are rotatably mounted. This rod is provided at each end with an arm 30 and to each of said arms one end of a rod 31 is connected. The other ends of these rods are secured to the rear brake beam 26. A depending arm 32 is also fixed to the rod 29 at a point intermediate of its ends and the lower end of said arm is pivotally connected to the rear end of the rod 25.

The forward axle of the trail wagon B is connected in the usual manner by means of chains, indicated at 33, to the rear axle of the lead wagon A.

In the operation of my improved brake device, the lead and trail wagons being coupled or connected together as shown in the drawing, upon descending an inclined grade, the trail wagon will gather momentum and move faster than the lead wagon. When this occurs, the sleeve 20 on the forward end of the bar 18 engages the bumper or stop 16 provided upon the rear end of the rod 13. The bar 18 is thus forced rearwardly upon the tongue 17 and through the medium of the links 23, the lever 21 is rocked upon its fulcrum, the lower end of this lever being forced upwardly and thereby drawing the rod 25 forwardly. In this movement of the rod 25, the transverse rod 29 is rocked in the bearing sleeves 28 upon the forward brake beam 26 of the trail wagon. The rods 31 connected to the arms on the ends of the rod 29 are thereby drawn forwardly and the brakes upon the rear beam 26 applied to the ground wheels. After these brakes have been applied the forward brake beam 26 is moved by the continued pull of the rod 25, and the blocks carried thereby applied to the peripheries of the wheels. It will, of course, be understood that the pressure of the blocks against the wheels will vary in accordance with the steepness of the grade. The brakes are constantly released as soon as the wagon or vehicle is on a level grade and the forward end of the bar 18 ceases to bear against the bumper 16.

From the foregoing it will be seen that I have produced a very simple and entirely automatic brake device whereby the brakes are instantly applied to the wheels of the trail wagon, thus releasing the operator of the care and attention necessary in the manipulation of additional levers for the operation of said brakes. Owing to the extreme simplicity of the device, it will be appreciated that the same is highly durable and serviceable in practical use, may be manufactured at small cost, and can be readily applied to the ordinary form of vehicle or wagon without necessitating the employment of skilled labor. It will, of course, be understood that while I have above described the preferred construction and arrangement of the several elements employed the invention is susceptible of considerable modification therein without departing from its essential features or sacrificing any of the advantages thereof, except as defined in the appended claims.

What I claim, is:

1. The combination with the lead and trail wagons, said latter wagon being provided with movable brake beams and having a forwardly extending tongue, of a bar slidably mounted upon said tongue, a rearwardly extending rod mounted upon the lead wagon and slidably connected to the forward end of said bar, connecting means between the rear end of said bar and the brake beams, and a bumper fixed to the rod on the lead wagon adapted to be engaged by the forward end of the slide bar, whereby said bar is moved and the brakes applied.

2. The combination with the lead and trail wagons, said latter wagon being provided with wheel brakes, and a forwardly extending tongue, of a bar slidably mounted upon said tongue and provided with a sleeve upon its forward end, a rod mounted upon the rear axle of the lead wagon and extending rearwardly therefrom, said rod being loosely engaged in the sleeve on said bar, a lever fulcrumed intermediate of its ends upon the forward axle of the trail wagon, a connection between the upper end of said lever and the rear end of said slide bar, operating means connecting the lower end of said lever to the brakes on the trail wagon, and a bumper on the rear end of the lead wagon adapted to be engaged by the sleeve on the forward end of said slide bar upon an excessive forward movement of the trail wagon to move said bar and apply the brakes.

3. The combination with the lead and trail wagons, said latter wagon being provided with wheel brakes and having the forwardly extending tongue, of a bar slidably mounted upon said tongue and provided with a sleeve on its forward end, a rearwardly extending rod mounted upon the lead wagon and loosely engaged in said sleeve, a yieldable bumper member fixed to said rod, a lever fulcrumed intermediate of its ends upon the forward axle of the trail wagon, links connecting the upper end of said lever to the rear end of the slide bar, and connecting means between the lower end of said lever and the brakes on the trail wagon, the sleeve upon the forward end of the slide bar being adapted to engage the bumper upon an excessive forward movement of the trail wagon to slide said bar and apply the wheel brakes.

In testimony whereof I hereunto affix my signature in the presence of two witnesses.

CHARLES H. LIKELY.

Witnesses:
I. A. LOVITT,
J. M. FOLKS.